United States Patent Office 2,764,040
Patented Sept. 25, 1956

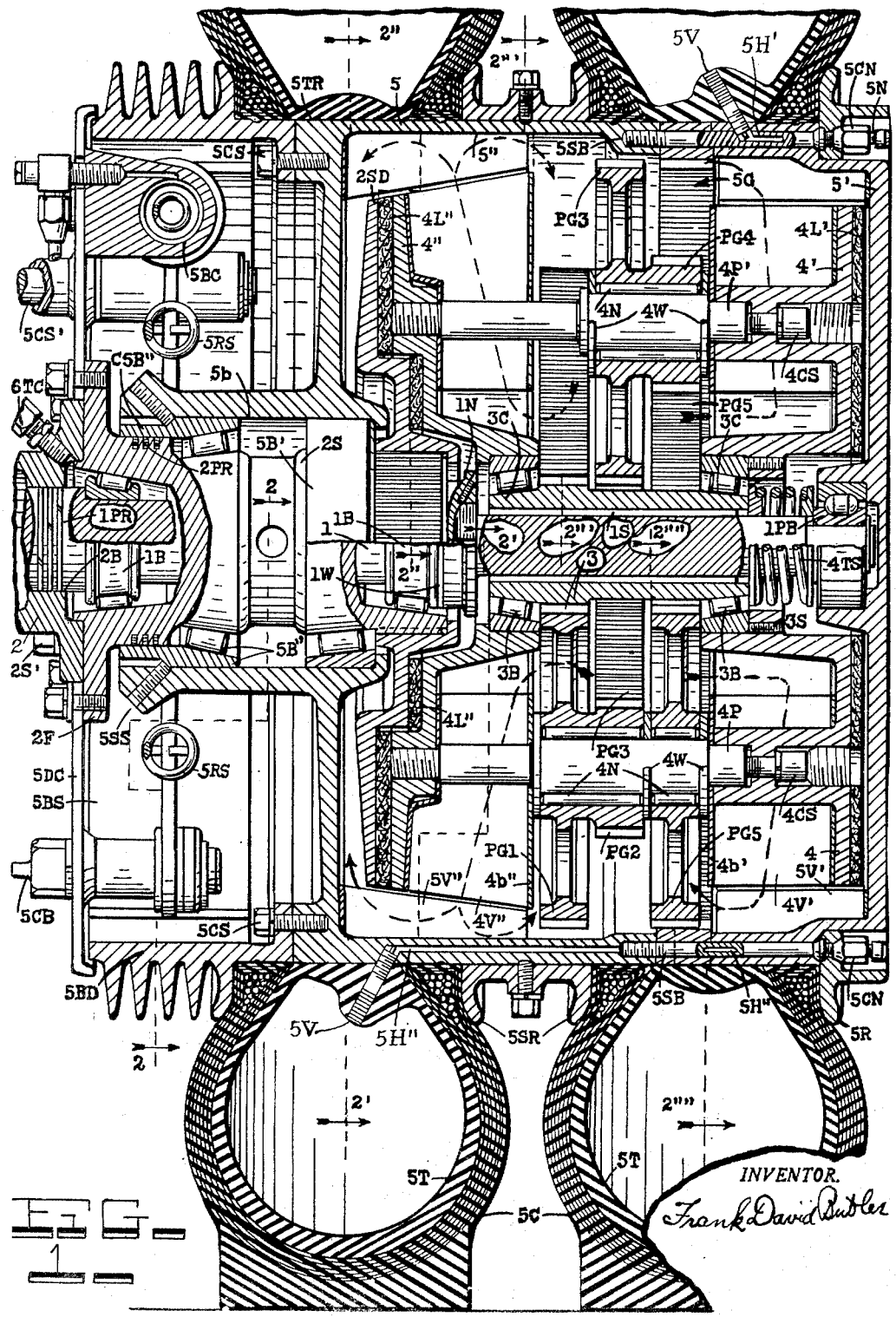

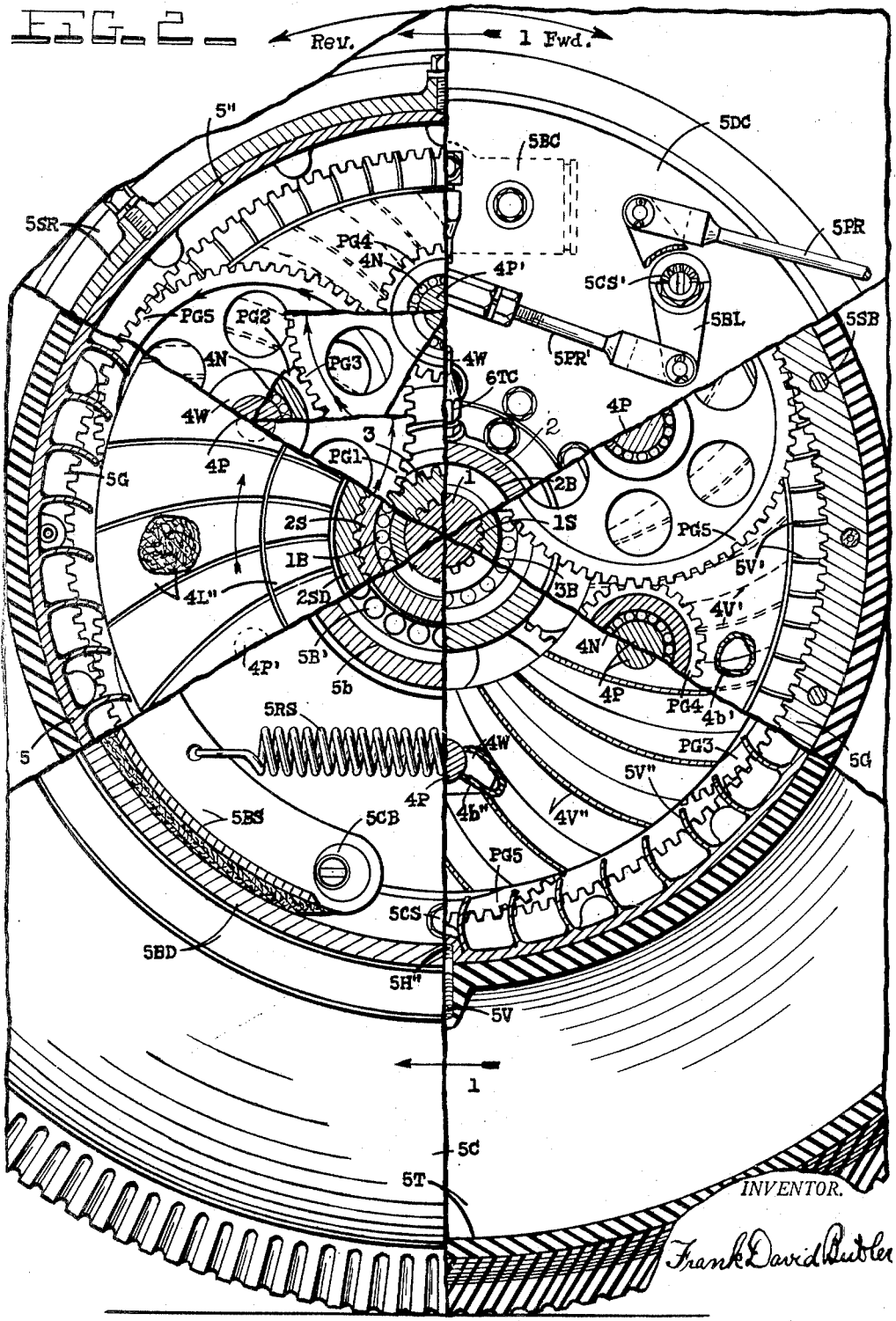

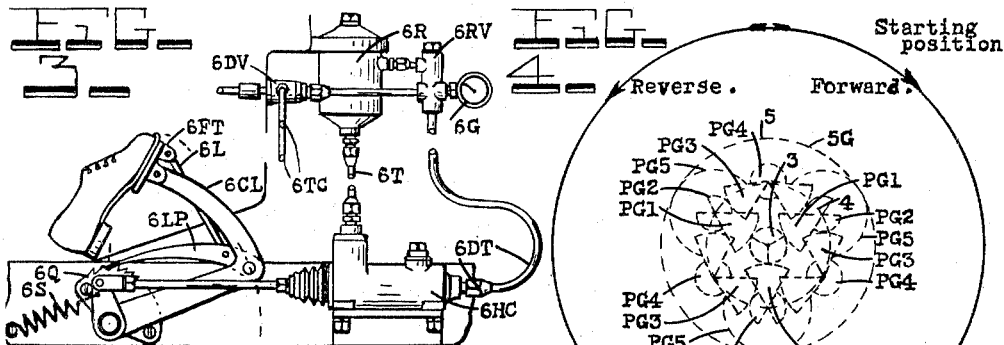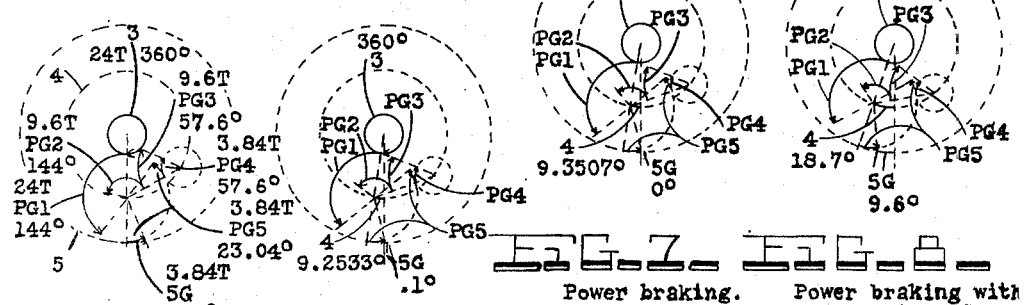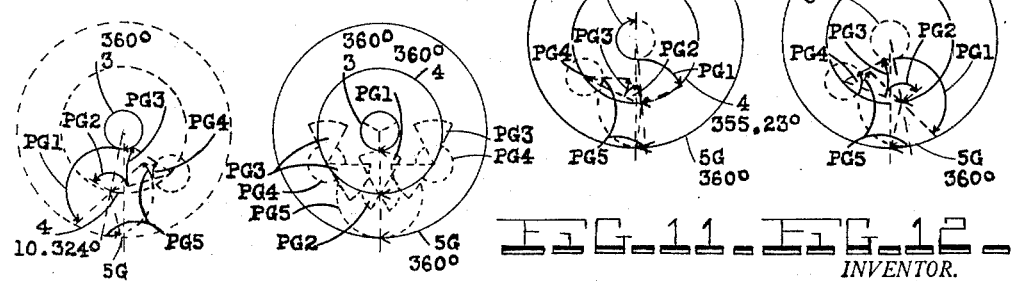

2,764,040

COMBINED HYDRODYNAMICAL AND MULTI-COMPOUNDED PLANETARY GEARING DRIVEN, INTERNAL FLUID PRESSURE ACTUATED AND CONTROLLED, DUAL FLOW TYPE OF VARIABLE REVERSIBLE TRANSMISSION COUPLER

Frank David Butler, Venice, Calif.

Application August 31, 1953, Serial No. 377,516

26 Claims. (Cl. 74—730)

While my present invention relates in general to reversible transmission couplers, it relates and applies more particularly to combined hydrodynamical and compounded planetary gearing driven, internal fluid pressure actuated semi-automatic and manually controllable, variable reversible transmission couplers, and especially to such types as are combined in forming the hubs of traction wheels of an automotive vehicle.

While subject type of couplers could be driven by substantially any type of motive power means, it is my present intention of using them as driven by my recently patented Dual Flow Pressure Velocity Compounded, Combustion Gas Turbine Motive Power Assembly, Serial No. 2,746,248, issued May 22, 1956, and which turbine forms a part of and is removable with the rear axle housing of an automotive vehicle.

The major conceptive improvements contained in this present coupler include the following: means of preferably triple-compounding the planet-gears thereof in such manner that the sun-gear, planet-gear-carrier and the orbit-gear with its carrier will all normally rotate in the same direction; means for initially axially displacing said planet-gear-carrier in one direction, within said orbit-gear-carrier, against a stator-disc braking surface, by a resilient spring member; a hydrodynamically operative means for initially axially displacing said planet-gear-carrier, in the opposite direction within said orbit-gear-carrier, against a clutching surface of the latter; a variable controllable means of applying fluid under a variable pressure to said coupler for reinforcing each initial means for axially displacing said planet-gear-carrier within said orbit-gear-carrier, and whereby through one application of such fluid means, the variable reversing of said orbit-gear in relation to said sun-gear will result, and will make controllable a reversing gearing ratio range that may extend substantially between infinity and zero, and between 37.5 revolutions of said sun-gear to one of said orbit gear, by using the triple-compounded planet-gearing ratio illustrated, and, where-through the other application, an extreme forward gearing ratio range will result and may extend between infinity and zero, and between one revolution of said sun-gear to one revolution of said orbit-gear, and will be variably manually controllable; and, numerous other minor improvements and combinations, incidental to the major improvements mentioned, that will appear as the specification progresses.

With reference to the several figures of the drawings: Fig. 1 is an axial section jointly in side elevation of the present coupler as applied in forming a dual tired traction wheel assembly for an automotive vehicle and as such coupler wheel assembly would appear on the dotted and broken line 1—1 of Fig. 2; while the latter figure is divided up into fragmentary sections of the coupler illustrated in Fig. 1, and wherein the right upper ⅙ of Fig. 2 is an end elevation, the left lower ⅙ is as on the line 2—2, the right lower ⅙ as on the line 2′—2′, the left middle ⅙ as on the line 2″—2″, the left upper ⅙ as on the line 2‴—2‴, and, the right middle ⅙ as on the line 2″″—2″″ of Fig. 1; Fig. 3 is a diagrammatical sketch illustrating a means of manually applying fluid under a variable pressure to at least one pair of said couplers; and, Figs. 4 to 12 inclusive are diagrammatical sketches illustrating different operative conditions of the coupler, starting with Fig. 4 wherein the rotative parts of the coupler are at rest and in the positions they occupy in Figs. 1 and 2.

With further reference to the drawings, the symbols thereof represent and indicate similar parts in the several views, and wherein: the numeral 1 indicates the coupler driving axle-shaft, which is full-floating and need only be rotated in one direction and extends between a motive power means, not illustrated, and the combined coupler and traction wheel assembly through a flanged, combined motive power and axle-housing, stator means 2 and a flanged tubular stator member 2S, extension thereof the latter, projecting an appreciable distance within said coupler; said axle-shaft 1 is rotatively supported, in full-floating manner within the stator 2S, upon the pair of adjustable tapering roller bearings 1B, which latter are provided with an adjustment tongued locking washer 1W and nut 1N, and wherein said shaft is also provided with an external splined portion 1S over which to slidably receive the elongated, internally splined, sun-gear 3, which latter rotatively supports, in full-floating manner, the coaxially rotatable combined planet-gear-carrier and multi-vaned fluid impeller 4 forming the intermediate and hydrodynamical driving member of the coupler, and which gear 3 and assembly 4 are slidable as an assembly, in either direction axially, upon said axle-shaft 1, and wherein further the latter is also provided with a pilot roller bearing assembly 1PB, located adjacent to the coupler end thereof and for alinement and support of the outer end of the orbit-gear-carrier 5, and, also wherein such shaft 1 is provided with a series of, snap-type of, piston-rings 1PR located in the bore 2B of stator housing 2 for prevention of fluid leakage thereby. The sun-gear 3 is provided integral with a pair of tapering roller bearing cones 3C, which latter form journals for the pair of adjustable roller bearings 3B, which latter are provided with a series of socket-headed set-screws 3S for adjustment of these bearings. The carrier 4 is of a halved type wherein such halves 4′ and 4″ are secured in alinement and together by the series of planet-gear journal pins 4P and 4P′ symmetrically spaced within said carrier 4 and each provided with a series of needle bearing journals 4N and a plurality of thrust washers 4W, and wherein each of said pins is shouldered against the halves of 4 and are threaded into half 4″ and secured by cap-screws 4CS in half 4′. Such intermediate member 4 may be provided with preferably three sets of triple compounded planet-gears wherein each such set consists of five gears PG1 to PG5 inclusive, wherein all are rotatively journalled upon said needle bearings 4N upon said journal pins, and wherein planet-gear PG1 meshes with said sun-gear 3 and is in tandem with gear PG2 rotatable on journal pin 4P and meshing with gear PG3, which latter is rotatable coaxially in tandem with gear PG4 upon journal pin 4P′ and in turn meshes with planet-idler-gear PG5 rotative independently on said journal pin 4P and meshing with the internally toothed orbit-gear 5G, which latter is carried between the halves 5′ and 5″ of said carrier 5, and, preferably wherein such combined triple compounded planetary gearing sets, said sun-gear 3 meshes with three planet-gears PG1 located in the same radial plane axially therewith, wherein the three planet-gears PG2 are located in the same radial plane axially as the three planet gears PG3 and each gear meshes with two of the opposite gears, wherein the three planet-gears PG4 are located in the same radial plane axially as the three idler-planet-gears PG5 and each gear meshes with two of the opposite gears, and also wherein the three gears PG5 also mesh with said orbit-gear 5G.

With reference to all the figures in general, while the compounded gearing ratio used in reducing the relatively high rotative speed of said sun-gear 3 down to a relatively low rotative speed of that of said orbit-gear 5G and its carrier 5, obtained through compounding of the sets of planet-gears PG1 to PG5 inclusive, is normally a matter of choice, the example illustrated herein is of a 37.5 to 1 triple compounded planetary gearing ratio type, wherein it would require 37.5 clock-wise revolutions of said sun-gear 3 to rotate said orbit-gear 5G one revolution anti-clockwise while the planet-gear-carrier 4 was purposely stopped. Otherwise, as with the orbit-gear-carrier 5 stopped, it would require 38.5 clockwise revolutions of said sun-gear 3 to rotate said planet-gear-carrier one complete revolution on its axis in the same direction, and wherein the difference between 37.5 and 38.5 is due to the fact that carrier 4 also rotates one revolution, as mentioned, and carries the planet-gears through 360° of arc change during such revolution. Thus, during one clockwise revolution of sun-gear 3 with the orbit-gear 5G stopped, the planet-carrier 4 will idle clockwise $\frac{1}{38.5}$ of 360° and/or 9.35°, then if said sun-gear is stopped and the orbit gear 5G is rotated clockwise one complete revolution, it will carry said planet-gear-carrier 4 through $\frac{37.5}{38.5}$ of 360° and/or 350.65°, and said sun-gear 3, planet-gear-carrier 4 and orbit-gear 5G will all be back to their starting points and/or in the equivalent of a one to one gearing ratio. As a matter of choice, the coupler illustrated is provided with spur-gears all of 8 diametral pitch, wherein the sun-gear 3 and the planet-gears PG2 and PG4 each have 3" pitch diameter and 24 teeth, the planet-gears PG1 and PG3, also the planet-idler-gear PG5 each have 7.5" pitch diameter and 60 teeth, and the internally toothed orbit-gear 5G is provided with 18" pitch diameter and 144 teeth. In such triple compounded planetary gearing arrangement, the tandem planet-gears PG1 and PG2 are identical to the similar tandem planet-gears PG3 and PG4, so thus are interchangeable, while the planet-idler-gear PG5 is identical in size to said gears PG1 and PG3 though not in tandem with any gear, and the gearing assembly is in the form of a hexagon as illustrated in Fig. 4.

From the data and facts presented thus far, it is apparent that with the sun-gear 3, carrier 4 and carrier 5 all rotating in the same forward direction, in this combined hydrodynamical and triple compounded planetary gearing driven coupler, that if a manually operative variable clutch-locking means could be applied between said carriers 4 and 5, in parallel with the automatic hydrodynamically operative progressive locking means already existing therebetween, that substantially an infinity to one to a one to one reduction gearing ratio range would thereby be made manually controllable throughout such range. It is further apparent that if the same type of manually operative variable clutch-locking means could be similarly applied as a braking means between said planet-gear-carrier 4 and an adjacent stator-disc-member, such as thrust-disc 2SD, that the coupler reversing ratio reduction range could then extend substantially between an infinity to one to a 37.5 to one range that would be manually controllable throughout such range.

Continuing with the construction specification, and with reference to Fig. 1, the outer one-half 4' of said hydrodynamical driving and intermediate member 4 is provided with a series of symmetrically spaced fluid impelling vanes 4V', which each extends semi-radically and helically axially for the purpose of simultaneously circulating fluid therefrom, into the adjacent row of series of vanes 5V' in the rim of carrier half 5' in such manner as to hydrodynamically impart an axial thrust of carrier 4, to the right against orbit-gear-carrier half 5'. While the inner one-half 4", of such carrier 4, is provided with a similar series of symmetrically spaced fluid impelling vanes 4V" of similar excepting tapered shape and for a similar purpose, and which vanes 4V" circulate fluid therefrom, into the adjacent row of series of vanes 5V" in the rim of carrier half 5", in such manner as to similarly impart an axial thrust of carrier 4 to the right, Fig. 1, and, wherein a resilient coil type of spring 4TS is provided and interposed between the pilot-bearing end of said sun-gear 3 and the inner race of said pilot-bearing 1PB for producing an initial axial pilot thrust of said carrier 4 to the left, Fig. 1, and against the braking surface of an annular shaped, stepped flanged stator-disc 2SD, which latter is internally splined and is a shouldered press-fit over an external spline located on the adjacent end of the tubular stator member 2S. In the construction of elements just described, the tension of the spring 4TS should be such as to pilot the carrier 4 to the left Fig. 1 under at rest and low hydrodynamical thrust force operation of said carrier 4, while the hydrodynamically actuated thrust of said carrier 4 to the right Fig. 1 should be sufficient under predetermined hydrodynamical operating conditions to pilot said carrier 4 to the right and in contact with the adjacent clutching surface of said carrier half 5', after over-powering the tension upon said spring 4TS. Inasmuch as said carrier member 4 is to be axially displaced in both directions within the carrier member 5, such member 4 is provided with a pair of friction linings 4L' and 4L", with both projecting in curved segmental form from the end faces thereof, and wherein the lining 4L' is bonded to the right, Fig. 1, end face, and the lining 4L" is bonded to the left, radially stepped, end face thereof such member 4, and wherein both linings assist in circulating fluid and in keeping the friction surfaces relatively cool by and through such circulation.

Inasmuch as the hydronamically actuated axial thrust pilot means and the resilient spring initial axial thrust pilot means are not sufficient within themselves to produce the required axial thrust, in one direction or the other of member 4 within member 5, and as neither of these pilot means are manually variable within themselves, it is apparent that each would have to be bolstered variably by some manually operable and controllable means, preferably operative jointly at will. Thus, with reference to Figs. 3, 2 and 1, the coupler is provided with a remotely located manually operable and controllable variable hydraulic pressure means with which to apply fluid under pressure to within said coupler via the tubing connection 6TC, threaded into stator 2, and which pressure means consists of: a vented, static head reservoir 6R connected via tubing 6T to a supply side of a common hydraulic master cylinder means 6HC which latter is provided with a discharge tubing connection 6DT to the axial center of a four-way tapering plug-valve type of manually controllable distributing valve 6DV, through which latter fluid may be applied, under a variable pressure, to two oppositely located couplers jointly, to either coupler independently, or held on both couplers jointly after being applied; wherein said master hydraulic cylinder 6HC is provided with the usual internal plunger, not illustrated, which is reciprocatable by the pivoted crank-lever 6CL, which latter is provided with a pivoted foot-treddle 6FT and a latching pawl 6LP pivoted therein and wherein 6FT and 6LP are connected with a link 6L for lifting 6LP from the teeth of the stator latching quadrant 6Q; and, wherein the plunger of cylinder 6HC is variable in its stroke by variable manually operating the lever 6CL in an oscillatable manner and wherein such lever is retractable by the resilient spring 6S, and it is possible to retain the lever 6CL depressed by latching pawl 6LP in said teeth of quadrant 6Q, also wherein the tubing 6T is vented to the atmosphere after each release of crank-lever 6CL subsequently to a fluid pressure application.

The annular shaped combined orbit-gear-carrier and multi-vaned closed fluid receptacle casing 5 is of a split type and is provided with: a closed outer one-half 5' and an internally bored and packed inner one-half 5" which are bolted together, with the orbit-gear 5G therebetween, by a series of symmetrically spaced, axially extending, collared stud-bolts 5SB which latter are each shouldered against the outside of half 5' and are threaded into the half 5", and wherein each bolt is provided with a conical nut 5CN for retaining a demountable tire rim 5R in place over the periphery edge of 5'; an annular shaped flanged brake-drum 5BD bolted to the half 5" by the series of cap-screws 5CS and provided to be a part of a tire rim 5TR forming the periphery of member 5; means for mounting a pair of dual pneumatic tire casings 5C, complete with internal valve inflated inner tubes 5T, upon such tire rim 5TR and separating such tires with an annular shaped detachable separator ring 5SR; two preferably oppositely located access holes 5H' and 5H", each extending axially in the rim of member 5 and preferably initiating adjacent a hole extending longitudinally in one of said bolts 5SB and terminating adjacent the inflation valve 5V of one of said inner tubes and providing a means by which the latter may each be individually inflated, from the outside of 5', through the capped nipple extensions 5N of bolts 5SB; two preferably oppositely located access holes, not illustrated but similar to 5H, extending longitudinally through two oppositely located bolts 5SB, excepting plug threaded at the outer ends thereof, via which to vent and drain member 5; an elongated bore 5b located in the half 5" and provided to receive, in press-fit manner, the opposed pair of tapering roller bearings 5B' and 5B" which latter are adjustable by the socket-headed set-screws 5SS; a recess bore in the half 5' to receive said pilot bearing assembly 1PB; and, a row of series of cupped vanes 5V', in half 5', co-operative with said row of vanes 4V' in 4', and a row of tapering vanes 5V", in half 5", cooperative with the row of tapering vanes 4V" in 4".

Inasmuch as the flanged tubular stator member 2S is formed into inner race cones for the tapering roller bearings 5B' and 5B", and also outer race cups for the tapering roller bearings 1B, it should be constructed of roller bearing material and treated accordingly. As is apparent, the axle-shaft 1, intermediate member 4 and driven member 5 are all three journalled in full-floating manner and wherein respectively the cup races of the two roller bearings of 1 are formed within the bore of stator 2S, the cone races of the two roller bearings of 4 are formed integral with sun-gear 3 with one cone located on either side thereof, and wherein the cone races of the two roller bearings of 5 are formed in the periphery of stator 2S.

As the coupler assembly forms the hub and traction wheel rim of a wheel assembly and as it will thus often be necessary to brake the driven member 5 of such coupler in both directions of its rotation, a combined manually and hydraulically operative brake-shoe means is provided along with the brake-drum 5BD of said member 5, and such a braking means consists briefly of: a pair of brake-shoe halves 5BS each adjustable, preferably at the lower end thereof by a combined anchor and cam-bolt 5CB, and adjustable at the opposite end thereof by the combined manually operative cam and adjustment shaft 5CS' which latter is provided with a cam end and a tapering serrated end so that it may be adjusted to place the shoe 5BS in close proximity to the brake-drum 5BD and is then operative by the lever 5BL and pull-rod 5PR which latter includes the obliquely extending adjustable rod 5PR'; the brake-pedal, not illustrated, for operating the rod 5PR should simultaneously reciprocate the piston of the master hydraulic unit similar to Fig. 3, and such pedal should be similarly provided with an emergency braking latching pawl, and the piston of the brake-cylinder 5BC should operate jointly with said cam means for safety purposes; two springs 5RS are provided for retracting the shoes 5BS; and, the drum dust cover 5DC is halved so that the latter may be removed for relining said shoes without interfering with the coupler proper.

As the coupler wheel assembly may be used for a complete replacement unit, it may be removed complete with the axle-shaft 1, from the stator housing 2, by removal of the series of cap-screws 2S'.

In order to restrict the diameter of the packing rings 2PR, inserted in the series of grooves in the periphery of stator 2S, adjacent its flange 2F, the cup of the roller bearing 5B" is formed into a projecting cylindrical chamber C5B" wherein such rings fit closely but do not rotate and are subjected to fluid pressure which tends to displace them axially. Also in order to restrict the maximum pressure upon the fluid applicable to within the coupler, a by-pass relief-valve 6RV is provided and is connected between the tubing 6DT and 6R, and a gauge 6G is also connected to 6DT to remotely register the fluid pressure applied. When a pair of couplers are used with one in each of two oppositely located traction wheel assemblies, and are connected to opposite sides of the distributing control valve 6DV, fluid pressure may be applied to each coupler independently or simultaneously by rotating the valve proper of such control means, and such valve should normally be located at the same level as said master hydraulic cylinder 6HC so as not to trap any air therein.

Before attempting to describe the operation of the coupler, a few pertinent obscure facts relative to hydro-dynamical and centrifugal force combinations should be exemplified: With an annular shaped, internally multi-vaned, coupler casing such as 5, filled with fluid and provided with a concentrically rotatable multi-vaned intermediate member, such as 4, coaxially rotatable with an axle-shaft, such as 1, upon an axis common to all and extending axially concentrically thereto; it would be possible to generate a relatively high peripheral fluid pressure within such coupler by rotating the member 4, and which pressure would progressively increase as the member 5 also started to rotate, and wherein such fluid pressure would tend to expand equally radially and axially to escape; wherein during such rotation of member 4 such fluid pressure would vary at each inch of radius and would be nill along the axis of rotation, and, wherein any air trapped within the coupler would thus tend to collect along the axis of rotation and could be vented off through the connection 6TC, Figs. 1 and 2, which is located at a higher level than said axis and is non-rotative. Under such existing conditions, of nill pressure along the axis, there should be substantially no fluid loss past the packing rings 1PR and 2PR, and the application of fluid under a variable pressure to within the coupler would have little resistance at such times. It is also obvious that in order to provide a progressive pressure actuated self-energizing clutching means between members 4 and 5, that such means could extend axially as well as radially in order to be operative. Thus subsequent to the initial contacting of member 4 against said stator disc 2SD, and/or the closed end of member 5, and during the progressive increasing in the normal forward rotation of members 4 and 5, the hydrodynamical pressure locking means operates in parallel with the clutching means in progressively reinforcing such initial contacting of said member 4, and vice versa during decreasing rotation of members 4 and 5, and, wherein such combined parallel locking means also simultaneously progressively locks all the planetary gearing of the coupler during such forward rotation so that said members 4 and 5 eventually rotate as one unit, and vice versa as the speed of rotation is progressively decreased. As the latter mentioned progressive combined locking means is automatic in its operation, the variable fluid pressure means is the means by which such coupler is manually controllable both as to direction of rotation of the member 5, in respect to the direction of and speed of rotation of the sun-gear 3, and also offers a means of accelerating such automatic locking means in its self-energizing control.

With reference to all the figures in general, the operation of the coupler is as follows: Fig. 4 diagrammatically illustrates all the rotative elements of the coupler at rest in the positions they occupy in Figs. 1 and 2, and which positions are considered as the starting point of rotation of said elements; Fig. 5 illustrates a condition resulting from applying sufficient fluid pressure to within the coupler to completely stop the rotation of member 4 by braking it against the stator disc 2SD, and resulting in the full reversing of member 5; Fig. 6 illustrates the results obtained by a relatively slight braking of member 4 against said member 2SD, and results in a minor reversing of said member 5; Fig. 7 illustrates the results obtained at idling motive power speed with no fluid pressure being applied to within the coupler, and wherein the initial axial displacement of member 4 against stator disc 2SD is sufficient to neutralize the rotation of member 5, and wherein the member 4 is idly rotating around the sun-gear 3, and under which conditions the member 5 could be held with the foot brake; Fig. 8 illustrates the results obtained as the motive power means is accelerated, and the hydrodynamical circulation of fluid within the coupler provides the member 4 with an initial axial thrust against the closed end of the member 5, and wherein said member 4 has been rotated 9.35° with and during 360° of rotation of sun-gear 3 and has been carried clockwise 9.35° with and during the 9.6° clockwise rotation of carrier member 5, thus resulting in a total rotation of 18.7° by said member 4; Fig. 9 illustrates a relatively heavy torque load condition of operation wherein the speed of rotation of the motive power means and of the sun-gear 3 may be at their top limit and the coupler gearing ratio relatively low for starting purposes, as with a vehicle heavy loaded upon a steep grade, wherein the peripheral fluid pressure being generated within the coupler is extremely low, due to the relatively low rotation of member 4, and wherein additional fluid pressure could be supplied to within the coupler, via the variable hydraulic means, to produce clutching between member 4 and member 5 in order to assist the hydrodynamical element of 4 in tending to rotatively drive member 5; Fig. 10 illustrates a one to one gearing ratio of the members 3, 4 and 5 which is applicable subsequently to the locking of such members as a single rotative unit by a combination of hydrodynamically operative fluid flow, and peripheral fluid pressure, acting in parallel with the clutching of member 4 against the closed end of member 5 and the inter-gearing locking of the planetary gearing means, and which gearing ratio can vary to a lower rating by either more power being applied or a greater torque load added; Fig. 11 illustrates a condition of power braking wherein the member 5, through combined hydrodynamical and centrifugal force peripheral fluid pressure generation, would tend to clutch-lock members 4 and 5 together as a single rotative unit; and, Fig. 12 illustrates conditions that would exist with the motive power means stopped and the members 4 and 5 rotating around the sun-gear 3, and wherein during one revolution of said member 5, it would carry member 4 through 350.65° of rotation, and wherein members 4 and 5 are tending to rotate 3 clockwise.

Attention should be focused on the fact that the relatively heavy combined coupler wheel assembly, if provided in oppositely located pairs, would act in the capacity of a pair of gyroscopic fly-wheels that once accelerated would tend to keep rolling as a heavier torque load of medium duration is applied. Thus an automotive truck so equipped would tend to keep rolling as it started to ascend a hill and if the latter was of extreme length would cause both couplers to automatically drop out of hydrodynamic step and go into a lower gearing ratio depending upon the conditions of operation and which change of ratio would be accomplished in an automatic manner.

In order that different pitch impellers may be applied to the same hydrodynamical driving member 4 and to provide an efficient baffle means extending between the suction and discharge sides of such impellers, the latter are provided with annular shaped shrouding discs 4b' and 4b'' to which the vanes 4V' and 4V'' respectively are secured, and wherein such discs are driven by and secured with the pins 4P and 4P' and may be conveniently removed by dismantling the member 4. It may also be pointed out that each planet-gear of each set, during the rotation of 4, tends to assist in the circulation and rotation of fluid within the driven member 5.

In order that the pneumatic inner tubes 5T may be either inflated and/or deflated while held securely in place upon the rim 5TR, the stem end of each tube inflation valve 5V should project into a suitable adjacent recess in such rim 5TR as illustrated in Figs. 1 and 2, and wherein the stem of each valve 5V may be depressed by a relatively small tube or wire inserted through the adjacent access hole 5H' or 5H'' as the case may be.

During the assembly of the coupler, the intermediate member 4 complete with the sun-gear 3, all the planet-gears and the two fluid impellers can be assembled as a unit and then slid over the spline 1S of the axle-shaft 1. Also inasmuch as the coupler wheel assembly can be used as a replacement unit spare complete with the axle-shaft 1, the brake-shoes 5BS and all rotative parts of the coupler are constructed so that they may be completely adjusted prior to attaching such unit to the flange of the axle-shaft housing member 2. The dust covers 5DC, of the brake drum 5BD, are provided in halves in lieu of an integral cover so that they may be removed without dismantling the coupler proper in case of relining the shoes 5BS. The tire separator 5SR is anchored to the tire rim 5TR by a series of cap-screws so that in case one tire 5C blows out, the rim ring 5TR cannot be displaced axially as a result therefrom. It should also be noted that the spring 4TS rotates with the axle-shaft 1 and is retained in alinement therewith by the flanged washers adjacent the ends of such spring.

While the coupler wheel assembly illustrated herein is in dual form as applicable to an automotive truck and/or buss, it is equally as applicable to a single transmission coupler traction wheel assembly.

As this present coupler wheel assembly includes several new combinations of means that are considerably different than those used in the past art, it is anticipated that various minor changes may be made, in actual practice and within the scope of the appended claims without infringing upon the concept of the invention as disclosed.

Thus having fully described my invention, I claim:

1. In a combined hydrodynamical and compounded planetary gearing driven internal fluid pressure variable transmission coupler of the class described and equipped with: a tubular stator member projecting within and upon which said coupler is journalled; an elongated drive-shaft journalled within said stator and provided with a sun-gear slidably axially thereover; an annular shaped coaxially rotatable combined planet-gear-carrier and multi-vaned fluid impeller journalled astride of said sun-gear and forming the intermediate and hydrodynamical driving member of such coupler; an annular shaped coaxially rotatable combined orbit-gear-carrier and multi-vaned closed fluid receptacle casing journalled upon said stator member and forming the gearing and hydrodynamically driven member of such coupler and provided with one end closed; and an internally toothed orbit-gear rotative with said driven member, the provision and combination therewith of a series of sets of triple compounded planetary gears rotatively journalled within and carried by said intermediate member; an annular shaped flanged stator-disc secured to and shouldered against the coupler end of said stator member and provided with a braking surface; a clutching surface formed within said closed end of said driven member and rotatable with the latter; a resilient coil spring interposed between a fixed collar upon said sun-gear and one end of said drive-shaft and providing said intermediate member, through said sun-gear, with an initial axial braking thrust against said stator-disc; means relative to constructing a predetermined number of the multiple-vanes of said intermediate member tapering and thereby providing the latter with a differential hydrodynamically actuated axial thrust towards and against said clutching surface of said driven member; means for supplying and applying said internal fluid pressure under a variable hydraulic pressure, through a valve control means, to within said coupler for respectively bolstering either said axial thrust of said spring or said hydrodynamically actuated axial thrust depending upon the relative hydrodynamical force being generated within the coupler during such application; and, means for applying said coupler as formed completely within the hub and rim of an internally variable and reversible dual traction wheel assembly.

2. The coupler of claim 1 characterized in that said series of sets of gears comprise at least one set of triple compounded planetary gears wherein the first gear meshes with said sun-gear and is in tandem and rotatable coaxially with the second gear which latter in turn meshes with a third gear which is similarly in tandem and rotates coaxially with the fourth gear which latter in turn meshes with a fifth or idling gear rotatable coaxially with the first and second gears and meshing with said orbit gear, and wherein the latter normally rotates in the same direction as said sun-gear.

3. The coupler of claim 1 characterized in that said resilient coil spring provides said intermediate member with an initial axial braking thrust against said stator disc and is bolstered by said variable hydraulic pressure and thereby provides a variable means of clutching said intermediate member against said stator-disc and results in a variable reversing of said driven member through planetary gearing action operable within such coupler.

4. The coupler of claim 1 characterized in that the providing of said intermediate member with a hydrohynamically actuated axial thrust towards and against said braking surface of said driven member, as bolstered by said variable hydraulic pressure, thereby provides a varaible clutching of said intermediate member and said driven member and which clutching tends to synchronize the rotation of these two members, and wherein this clutching is further bolstered by hydrodynamically progressively generated hydraulic pressure during the normal variable rotation of such hydrodynamical driving and hydrodynamically driven members.

5. The coupler of claim 1 exemplified in that said planet-gear-carrier is provided with a friction surface at each opposite end thereof and this carrier is variably axially braked, in one direction, against said stator-disc for producing variable reversing of said orbit-gear-carrier, and is variably axially clutched, in the opposite direction, against said closed end of such orbit-gear-carrier for producing synchronization of the rotation of these two carriers while they are rotating in the same direction as said sun-gear.

6. The coupler of claim 1 exemplified in that said resilient coil spring providing said intermediate member with an initial axial braking thrust against said stator-disc as opposed by said differential hydrodynamically actuated axial thrust of said intermediate member against said clutching surface of said driven member, each constituting separate pilot means which determine the axial direction said intermediate member will be variably displaced within said driven member when said fluid under a variable hydraulic pressure is applied to within said coupler for bolstering such displacement of said intermediate member.

7. The coupler of claim 1 characterized in that said drive-shaft, said intermediate member and said driven member are each provided with an adjustable pair of roller bearing journals upon which each is mounted in full-floating manner, and wherein the outer race cups of said drive-shaft bearings are formed within said stator member, the inner race cones of said intermediate member bearings are integral with and located on either side of said sun-gear, and the inner race cones of said driven member bearings are integral with said stator member.

8. An annular shaped combined hydrodynamical and planetary gearing driven internal fluid pressure variable and reversible transmission coupler formed within the hub of a traction wheel and comprizing: a tubular stator extending concentrically within and forming the support member of the coupler; an elongated drive-shaft rotatable in one direction within said stator; an elongated sun-gear rotatable coaxially with and slidable axially over said shaft; an annular shaped combined multi-planet-gear-carrier and multi-vaned fluid circulating impeller rotatable coaxially astride of and slidable axially with said sun-gear and forming the intermediate and hydrodynamical driving member; an annular shaped combined orbit-gear-carrier and multi-vaned fluid receptacle casing provided to rotate concentrically upon said stator, to have one end closed and the opposite end packed and to form the gearing and hydrodynamically driven member of such coupler as well as said hub of such traction wheel; an annular shaped stator-disc secured concentrically to the coupler end of said tubular stator and provided with a braking surface on one side; a clutching surface formed within said closed end of and rotatable with said driven member; a series of sets of symmetrically spaced multiple compounded planet-gears with each gear provided to be rotatively journalled within and carried by said intermediate member; an internally toothed orbit-gear rotatable with said driven member and meshing with a predetermined number of planet-gears; a resilient coil spring interposed between one end of said sun-gear and a shoulder on the adjacent end of said shaft and providing said intermediate member with an initial axial braking thrust against said stator-disc; means, formed by predetermined differential construction of said multi-vanes of said intermediate member, for providing such intermediate member with an initial and progressive hydrodynamically actuated axial displacement and clutching thrust against the closed end of said driven member; and, means for supplying and applying fluid under a variable hydraulic pressure, through a control valve connected in series therewith, to within said coupler for respectively bolstering either said axial thrust of said spring or said hydrodynamically actuated axial thrust of said intermediate member depending upon the relative hydrodynamical force being progressively generated by the latter during such application.

9. The coupler of claim 8 characterized in that said series of sets of multiple compounded planet-gears may be of triple compounded type wherein each set comprises: a relatively large diameter first gear meshing with said sun-gear and rotatable in tandem coaxially with a relatively small diameter second gear which latter gear in turn meshes with a relatively large diameter third gear which is similarly rotatable in tandem coaxially with a relatively small diameter fourth gear; which latter gear in turn meshes with a fifth or idling gear rotatably coaxially with but independently of said first and second gears and meshes with said orbit-gear; and, wherein the latter normally rotates in the same direction as said sun-gear, and wherein further such tandem gears may be constructed identical and interchangeable one with the other.

10. The coupler of claim 8 characterized in that said resilient coil spring initially actuates and displaces said intermediate member axially in one direction and results in the latter being braked against said stator disc; while the differential construction of said multi-vanes of said intermediate member provides a means of initially and progressively hydrodynamically actuating and displacing said intermediate member axially in the opposite direction and results in such intermediate member being clutched against said closed end of said driven member; while the application of said fluid under a variable hydraulic pressure to within said coupler provides a means of bolstering the axial displacement of said intermediate member in either direction depending upon the hydrodynamical pressure being progressively generated within such coupler during the rotation of such intermediate member during such application; wherein the axial displacement of said intermediate member by said spring, as bolstered by said fluid under such variable pressure, results in said driven member being variably reversed in rotation in respect to the rotation of said sun-gear, while the axial displacement of said intermediate member by such progressive hydrodynamically actuated means, as bolstered by said fluid under such variable pressure, results in such intermediate and driven members being variably synchronized in their rotation in the same direction of rotation as said sun-gear; and, wherein such combination results in such transmission coupler traction wheel being provided to be variable and reversible within itself.

11. The coupler of claim 8 exemplified in that said multi-planet-gear-carrier is provided with a friction surface at each opposite end thereof and this carrier is variably axially displaced and braked, in one direction, against said stator-disc and thereby produces a variable reversing of said driven member in respect to said sun-gear rotation, and is variably axially displaced and clutched, in the opposite direction, against said closed end of said driven member and thereby results in the variable synchronization of the rotation of such intermediate and driven members while they are rotating in the same direction as said sun-gear.

12. The coupler of claim 8 exemplified in that said resilient coil spring providing said intermediate member with an initial axial displacement and braking thrust against said stator-disc, as opposed by said differential hydrodynamically actuated axial displacement and clutching thrust of said intermediate member against said clutching surface within the closed end of said driven member, each constituting separate pilot means which determine the axial direction said intermediate member will be variably displaced within said driven member when said fluid under said variable hydraulic pressure is applied to within said coupler for bolstering such opposite displacement of said intermediate member.

13. The coupler of claim 8 further characterized in that said drive-shaft, said intermediate member and said driven member are each provided with an adjustable pair of roller bearing journals upon which each is mounted to rotate in full-floating manner, and wherein the outer race cups of said drive-shaft bearings are formed integral within said stator, the inner race cones of said intermediate member bearings are integral with and located on either side of said sun-gear, and the inner race cones of said driven member bearings are integral with said stator member and are located in the intermediate length of the external portion of such stator.

14. The coupler of claim 8 characterized in that said sun-gear comprises: an elongated annular shaped internally splined and externally toothed gear integral with a pair of oppositely tapering roller bearing cone journals with one of the latter located on either side of the sun-gear proper; and, wherein the latter is normally heat-treated and ground.

15. The coupler of claim 8 characterized in that said tubular stator comprises: an elongated annular shaped stator provided with a flange at one end and an external shouldered spline at the opposite end thereof; a pair of integral oppositely tapering roller bearing journal cones located in the external intermediate length thereof; a pair of integral oppositely tapering roller bearing journal cups with one located internally adjacent either end thereof; a series of packing ring grooves located externally in a cylindrical portion adjacent to said flanged end; and, wherein such tubular stator is normally heat-treated and ground.

16. The coupler of claim 8 characterized in that said stator-disc comprises: an annular shaped internally splined and shouldered flanged hub forming a stator-disc provided with a braking surface on one side thereof.

17. The coupler of claim 8 characterized in that said intermediate member substantially comprises: a halved type of annular shaped combined multiple compounded planet-gear-carrier and multi-vaned fluid impeller secured together by a series of symmetrically spaced planet-gear journal pins which latter rotatively drive a pair of rows of fluid impellers; a flanged bore in each half with each bore provided to receive the journal cup of a pair of oppositely tapering roller bearings; and, a pair of friction surfaces with one located externally at each end of such intermediate member.

18. The coupler of claim 8 characterized in that said driven member substantially comprises: a halved type of elongated semi-annular shaped multi-vaned fluid receptacle casing provided with a flanged bore at said packed end thereof to receive the cups of a pair of oppositely tapering roller bearings upon which latter said driven member is journalled; a recess bore in the closed end, one half of said casing provided to receive a pilot roller bearing, an annular shaped clutching surface located radially outward from such pilot bearing bore and internal to said closed half of said casing; a series of symmetrically spaced collared stud-bolts provided to extend axially within a rim portion of such halves and for securing the latter together with said orbit-gear intermediate thereto; an annular shaped detachable flanged brake drum secured to the packed end of said casing and forming a part of the traction wheel rim; and, a pair of rows of said multiple-vanes that may be in the form of buckets with one row fabricated into each half of said casing.

19. In an annular shaped combined hydrodynamical and planetary gearing driven transmission coupler equipped with an elongated tubular stator projecting concentrically therein, an elongated drive-shaft rotatable in one direction within said stator, an elongated sun-gear rotatable coaxially with and slidable axially over said shaft, an annular shaped combined planet-gear-carrier and multi-vaned fluid circulating impeller rotatable coaxially astride of and slidable axially with said sun-gear and forming the intermediate and hydrodynamical driving member, an annular shaped combined orbit-gear-carrier and multi-vaned fluid receptacle casing provided to have one end closed and the opposite end packed and to form the gearing and hydrodynamically driven member rotatable in either direction upon said stator, and, means for supplying and applying fluid under a variable pressure to within said casing; the combination provision therewith of: an annular shaped stator-disc secured concentrically to the coupler end of said tubular stator and provided with a braking surface located adjacent one end of said intermediate member; a clutching surface formed within said closed end of and rotatable with said driven member; a series of sets of symmetrically spaced multiple compounded planet-gears with each gear provided to be rotatively journalled within and carried by said intermediate member; an internally toothed orbit gear rotatable with said driven member and meshing with a predetermined number of said compounded planet-gears; a resilient coil spring interposed between one end of said sun-gear and a shoulder on the adjacent end of said shaft and providing said intermediate member with an initial axial braking thrust against said stator disc and operative jointly with said variable fluid pressure; and, means, formed by predetermined differential construction of said multivanes of said intermediate member, for providing such intermediate member with an initial and progressive hydrodynamically actuated axial displacement and clutching thrust against said closed end of said driven member and operative jointly with said variable fluid pressure for synchronizing the rotative speeds of said intermediate and driven members.

20. In an annular shaped combined hydrodynamical and planetary gearing driven transmission coupler equipped with a tubular stator projecting concentrically therein, a drive-shaft rotatable concentrically in one direction within said stator, an elongated sun-gear coaxially rotatable with and slidable axially over said shaft, an annular shaped combined planet-gear-carrier and multi-vaned fluid circulating impeller coaxially rotatable astride of and slidable axially with said sun-gear and forming the intermediate and hydrodynamical driving member, an annular shaped combined orbit-gear-carrier and multi-bucketed fluid receptacle casing concentrically rotatable upon said stator and provided with one end closed and the opposite end packed and to form the gearing and hydrodynamically driven member, an annular shaped stator-disc secured concentrically to the coupler end of said tubular stator and provided with a clutching surface on one side, a braking surface formed within the closed end of said driven member, an internally toothed orbit-gear rotatable with said driven member, a series of symmetrically spaced planet-gears journalled in and carried by said intermediate member, and, means for supplying and applying fluid under a variable pressure via a control valve to within said casing, the provision therewith of: means for multiple compounding said planet gears so that said orbit-gear will normally rotate in the same direction as said sun-gear; a resilient coil spring mounted over said shaft and bearing against one end of said sun-gear and providing said intermediate member with an initial axial braking thrust against said stator-disc, and operative jointly, under predetermined conditions of operation, with said variable fluid pressure for variably reversing said driven member in respect to the rotation of said sun-gear; and, as combined with means, formed by predetermined differential construction of said multi-vanes of said intermediate member, for providing such intermediate member with an initial and progressive hydrodynamically actuated axial displacement and clutching thrust against said closed end of said driven member, and operative jointly, under predetermined condition of operation, with said variable fluid pressure for variably synchronizing the rotation of said intermediate and driven members in the same direction of rotation as and in conjunction with said sun-gear through combined hydrodynamical and multiple compounded planetary gearing action.

21. The coupler of claim 20 exemplified in that said spring providing said intermediate member with such initial axial braking thrust against said stator disc, thereby forms a pilot means for placing such intermediate member in position for being bolstered by the joint action of said variable fluid pressure, and wherein such joint action of such spring and such variable fluid pressure thus provides a means of variably reducing or stopping the rotation of said intermediate member, and thereby results in variably reversing the rotation of said driven member in respect to said sun-gear through combined multiple compounded planetary gearing and hydrodynamical action within such coupler.

22. The coupler of claim 20 exemplified in that said differential construction of said multi-vanes providing said intermediate member with said initial and progressive hydrodynamically actuated axial displacement and clutching thrust against said driven member, thereby forms a pilot means for first overcoming the thrust of said spring and placing such intermediate member in position for clutching against said driven member, and then acts in the capacity of a progressive hydrodynamically actuated pressure means for progressively enforcing such axial clutching between said intermediate and driven members as jointly operative with said variable fluid pressure, and thereby provides a variable means for synchronizing the rotation of such intermediate and driven members.

23. The coupler of claim 20 characterized in that said driven member may form the hub and rim proper of a traction wheel wherein such driven member is made variable and reversible within itself and is provided with a variable combined hydrodynamical and multiple compounded planetary gearing action in each direction of its rotation as described.

24. The coupler of claim 20 characterized in that said drive-shaft, said intermediate member, said driven member, and said compounded planet-gears, are all journalled to rotate upon roller bearings in full-floating manner to reduce frictional wear; and, wherein said tubular stator forms the outer race cups of the roller bearing journals of said shaft, also the inner race cones of the roller bearing journals of said driven member, while the ends of said sun-gear form the inner race cones of the roller bearing journals of said intermediate member, and, each of said planet-gears form the outer race cup of their respective roller bearing journals.

25. In an annular shaped combined hydrodynamical and multiple compounded planetary gearing driven transmission coupler of the class described and in combination with a tubular stator projecting concentrically into and supporting such coupler, a drive-shaft rotatable concentrically in one direction within said stator, an elongated sun-gear coaxially rotatable with and slidable axially over said shaft, an annular shaped combined planet-gear carrier and multi-vaned fluid circulating impeller coaxially rotatable astride of and slidable axially with said sun-gear and forming the intermediate and hydrodynamical driving member, a semi-annular shaped combined orbit-gear-carrier and multi-bucketed fluid receptacle casing rotatable concentrically upon said stator and provided with one end closed and the opposite end packed and to form the gearing and hydrodynamically driven member, a flanged annular shaped stator-disc secured concentrically to the coupler end of said tubular stator and provided with a braking surface on one side, a clutching surface formed within said closed end of said driven member, a series of symmetrically spaced compounded planet-gears journalled in and carried by said intermediate member, an internally toothed orbit-gear rotatable with said driven member, and, means for supplying and applying fluid under a variable pressure, via a control valve, to within said casing; the provision of: a resilient coil spring mounted over said shaft and exerting pressure against one end of said sun-gear and providing said intermediate member with an initial axial braking thrust against said stator-disc, and operative jointly, under predetermined conditions of operation, with said variable fluid pressure for variably reversing said driven member in respect to the rotation of said sun-gear; and, as combined with means, formed by predetermined differential construction of said multi-vanes of said intermediate member, for providing such intermediate member with an initial and progressive hydrodynamically actuated axial displacement and clutching thrust against said closed end of said driven member, and operative jointly, under certain predetermined conditions of operation, with said variable fluid pressure for variably synchronizing the rotation of said intermediate and driven members in the same direction of rotation as and in conjunction with said sun-gear through combined hydrodynamical and multiple compounded planetary gearing action.

26. In a combined hydrodynamical and multiple compounded planetary gearing driven transmission coupler and in combination with a tubular stator extending within said coupler, a flanged stator-disc secured concentrically to the coupler end of said stator, an elongated drive-shaft rotatable in one direction within said stator, an elongated sun-gear rotatable coaxially with and slidable axially over said shaft, an annular shaped combined compounded planet-gear-carrier and multi-vaned hydrodynamical driving member rotatable coaxially astride of and slidable axially with said sun-gear, a combined orbit-gear-carrier and multi-bucketed fluid receptacle casing rotatable concentrically upon said stator and provided with one end closed and the opposite end packed and forming the gearing and hydrodynamically driven member, and, means for supplying and applying fluid under a variable pressure to within said casing; the provision of: a spring exerting elastic pressure against one side of said sun-gear and providing said planet-gear-carrier with an axial thrust against said stator disc, and operatable jointly with said variable fluid pressure in variably reducing the rotation of said planet-gear-carrier and thereby resulting in a variable reversing of said driven member in relation to the rotation of said sun-gear; and, as opposed by predetermined differential vane construction means for providing said planet-gear-carrier with a progressive hydrodynamically actuated axial clutching thrust against said closed end of said driven member, and operative jointly with said variable fluid pressure in variably synchronizing the rotation of said intermediate and driven members in the same direction of rotation as and in conjunction with said sun-gear.

References Cited in the file of this patent

UNITED STATES PATENTS

| | | |
|---|---|---|
| 2,289,991 | Paxman | July 14, 1942 |
| 2,572,310 | Brown | Oct. 23, 1951 |